J. M. DODGE.

Assignor, by Mesne Assignments, to A. H. & H. L. ANDREWS.

STOP HINGE.

No. 10,638. Reissued Aug. 18, 1885.

Witnesses,

Jas. E. Hutchinson.

J. A. Rutherford

Inventor.

James M. Dodge,

By West & Bond

Attys.

N. PETERS, Photo-Lithographer, Washington, D. C.

UNITED STATES PATENT OFFICE.

JAMES M. DODGE, OF CHICAGO, ILLINOIS, ASSIGNOR, BY MESNE ASSIGNMENTS, TO ALFRED H. ANDREWS AND HERBERT L. ANDREWS, OF SAME PLACE.

STOP-HINGE.

SPECIFICATION forming part of Reissued Letters Patent No. 10,638, dated August 18, 1885.

Original No. 221,290, dated November 4, 1879. Application for reissue filed March 31, 1881.

DIVISION B.

*To all whom it may concern:*

Be it known that I, JAMES M. DODGE, formerly of the city, county, and State of New York, now a resident of the city of Chicago, county of Cook, and State of Illinois, have invented a new and useful Improvement in Stop-Hinges, which is fully described in the following specification, reference being had to the accompanying drawings, in which—

Figure 1:
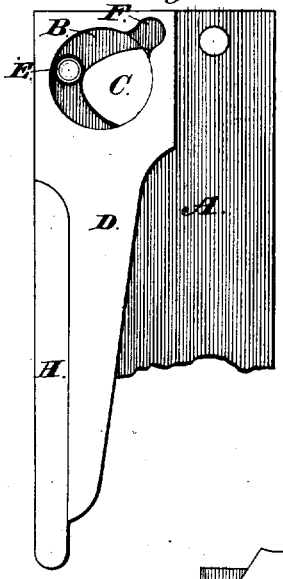
Figure 3:
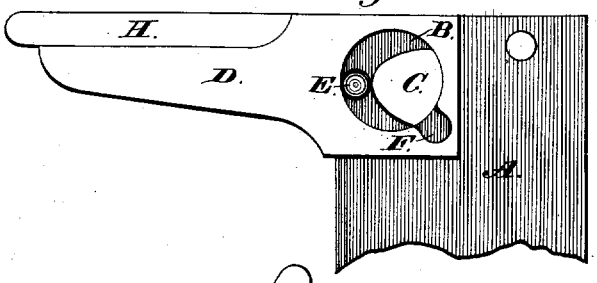
Figure 2:
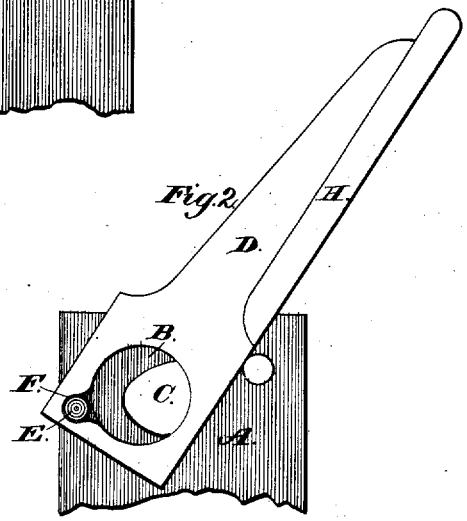
Figure 4:
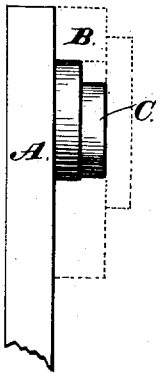
Figure 5:
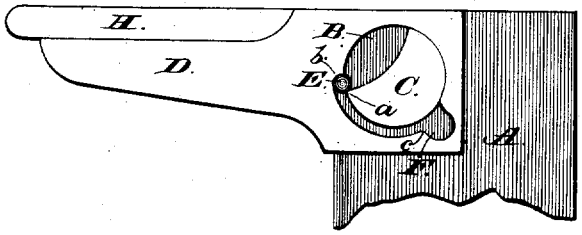

Figures 1, 2, and 3 respectively represent side elevations of the hinge applied to the lid of a desk, with the lid in vertical, thrown-back, and in horizontal positions. Fig. 4 is a front elevation of the pintle or stud attached to a part of a desk, with the movable arm and its socket indicated by dotted lines. These figures represent a form of hinge fully described in the other division of this reissue. Fig. 5 represents a side elevation of the hinge forming the subject-matter of this division.

My invention relates to a hinge for desks and other articles in which one part is movable and it is desired to stop the movable part at certain points.

Heretofore stop-hinges have been made by providing for sufficient play on a pivot to permit the movable part of the hinge to be lifted over projections on the fixed part which would otherwise arrest its motion. This kind of hinge is objectionable, for the reason that the entire weight of the movable section to which the movable part of the hinge is attached must be lifted over the projections in order to disengage the stop and permit the further movement of the hinged section, and also on account of the noise occasioned by the play of the two parts of the hinge when operated.

The object of my invention is to provide a hinge in which the movable part may be stopped and held in the position desired and released by simply turning the movable member in the proper direction without lifting and without noise in its operation.

The invention consists in the combination, with a desk-standard having a corner and a lid-arm pivoted to the said standard and having a shoulder, of an unattached movable locking stop-piece automatically thrown into and out of action by the movements of the lid-arm.

In the drawings I have represented the hinge applied to a school-desk, the top or lid of which is intended to be hinged to the upright portion, so as to be raised and lowered.

In these drawings, A represents one of the standards or end pieces of the desk, and B the stud or pintle of the hinge which is fixed to the standard. The base of the stud or pintle is round, with a sufficient projection to keep the movable part in place when turned, while the remaining part projects, and is cut away at one side, as shown in Fig. 5, to form a guide-passage and a stop for the stop-piece.

The movable part D of the hinge is provided with a knuckle or socket, which is fitted to receive the stud or pintle B, and is closed so as to cover the pintle, which forms a covered passage for the movements of the stop-piece. The stop-piece E, in the form shown, is a ball, which is placed in the passage or vacant space between the stud and the socket. The stud is so cut away as to form a stop at *a*, and the socket is cut away to form a stop at *b*, for arresting the movement of the hinged arm D and holding it in the position designed for use. The socket is also cut away, so as to form a passage between it and the stud, by which the stop-piece is returned to its locking position after the lid has been let down.

The movable part D of the hinge is provided with a pocket or recess, F, having a shoulder, *c*, which carries the stop-piece back into position for again locking the movable arm.

To operate the lid H, it is first elevated so that the stop-piece E will pass into the recess F, when the lid can be let down. The lowering of the lid carries the stop-piece around and delivers it onto the stud, and it passes down by gravity into a working position, so that when the lid is lifted slightly above its position for use the stop-piece will engage between stops *a b* and lock the arm when lowered to position for use.

It will thus be seen that a stop is provided for the hinge which requires no lifting, all of the parts being operated by turning the movable part of the hinge upon its pintle in the ordinary way.

The construction is very simple and not liable to derangement, and as the wall is inclosed, and therefore protected from dirt, the wear is very slight.

In applying the hinge to desks the lid or top H is fastened to the socket or knuckle pieces D, so as to rise and fall with them. The standards or end pieces may also be provided with suitable stops to arrest the upward movement of the lid and hold it in an elevated position, as shown in Fig. 2 of the drawings, if desired.

Modifications may be made in the construction of the two parts of the hinge. The pintle may have only a groove in its end piece, through which the ball or stop piece may pass from its elevated position to its lower or working position; or this passage may be a hole drilled through the body of the pintle, the arrangement of the pocket in the socket or knuckle being changed to correspond. The socket or knuckle may also have one or more pockets arranged in different ways to take the stop-piece in different positions.

Instead of the sphere shown, a cylindrical stop-piece may be employed, or an oval-shaped piece will operate in practice, though I prefer the spherical form, as with it there is less friction and the movement is more free. It is only necessary in the construction of the hinge to provide for the locking of the stop-ball between the movable and fixed parts at the point where it is desired to stop the hinge, to provide a pocket or recess in the movable part in which the ball may be taken from its working position and carried around therein as the movable part drops, and to provide a passage in the pintle or fixed part along which the ball may pass from its elevated position to its working position by the action of gravity. Whenever these conditions are obtained, the principle of my invention will be incorporated. I do not, therefore, confine myself to the precise construction of parts herein described and shown, for it is evident that my improvement may be applied not only to desks, but to many other articles in which there is a vibration of one or more parts in a vertical or substantially vertical direction, and in applying the invention to various articles it will be found necessary to change the form and construction of the parts to adapt them to the special locations in which they are placed and the particular result which it is desired to obtain. These changes may be readily made, however, and still retain the simplicity, durability, and cheapness of the hinge.

What I claim is—

The combination, with a desk standard having a corner and a lid-arm pivoted to the said standard and having a shoulder, of an unattached movable locking stop-piece automatically thrown into and out of action by the movements of the lid-arm.

JAMES M. DODGE.

Witnesses:
O. W. BOND,
A. H. ADAMS.